(12) United States Patent
Zhang et al.

(10) Patent No.: US 8,785,859 B2
(45) Date of Patent: Jul. 22, 2014

(54) DISTRIBUTED OPTICAL FIBER SENSOR BASED ON RAMAN AND BRILLOUIN SCATTERING

(75) Inventors: Zaixuan Zhang, Zhejiang (CN);
Chenxia Li, Zhejiang (CN);
Shangzhong Jin, Zhejiang (CN);
Jianfeng Wang, Zhejiang (CN);
Huaping Gong, Zhejiang (CN); Yi Li, Zhejiang (CN)

(73) Assignee: China Jiliang University, Zhejiang (CN)

( * ) Notice: Subject to any disclaimer, the term of this patent is extended or adjusted under 35 U.S.C. 154(b) by 66 days.

(21) Appl. No.: 13/637,910

(22) PCT Filed: Aug. 20, 2010

(86) PCT No.: PCT/CN2010/076181
§ 371 (c)(1),
(2), (4) Date: Sep. 27, 2012

(87) PCT Pub. No.: WO2011/127705
PCT Pub. Date: Oct. 20, 2011

(65) Prior Publication Data
US 2013/0020486 A1 Jan. 24, 2013

(30) Foreign Application Priority Data
Apr. 13, 2010 (CN) .......................... 2010 1 0145895

(51) Int. Cl.
*G01J 5/02* (2006.01)
*H01S 3/00* (2006.01)
*G01L 1/24* (2006.01)
*G01B 11/16* (2006.01)
*G01D 5/353* (2006.01)
*G01K 11/32* (2006.01)

(52) U.S. Cl.
CPC ................ *G01B 11/16* (2013.01); *G01L 1/247* (2013.01); *G01L 1/242* (2013.01); *G01D 5/35364* (2013.01); *G01K 11/32* (2013.01)
USPC ............ 250/349; 359/334; 359/341.1; 372/6; 356/301; 702/42

(58) Field of Classification Search
USPC .......................................... 250/349; 359/334
See application file for complete search history.

(56) References Cited

U.S. PATENT DOCUMENTS

| | | | |
|---|---|---|---|
| 6,233,261 B1* | 5/2001 | Mesh et al. ............... | 372/29.012 |
| 7,170,590 B2 | 1/2007 | Kishida | |
| 2002/0196527 A1* | 12/2002 | Veith .............................. | 359/334 |
| 2004/0028359 A1* | 2/2004 | Tirloni et al. .................. | 385/123 |
| 2005/0157982 A1* | 7/2005 | Shishido et al. ................ | 385/37 |
| 2008/0008431 A1* | 1/2008 | Shikii et al. .................... | 385/115 |

FOREIGN PATENT DOCUMENTS

| | | |
|---|---|---|
| CN | 1973178 | 5/2007 |
| CN | 101158592 | 4/2008 |
| CN | 101162158 | 4/2008 |
| CN | 101162158 A * | 4/2008 |

OTHER PUBLICATIONS

Gong et al.—CN101162158A—Apr. 16, 2008—English Translation obtained from Global Patent Search Network at http://gpsn.uspto.gov/#/patent/q=(photon%20NEAR5%20sensor)%20AND%20(Raman%20AND%20Brillouin%20scattering)&fq=id:CN101162158A on Feb. 5, 2014, pp. 1-7.*
Google Translate, translation of Fabry-Perot (FP) cavity laser from Chinese to English, obtained from http://translate.google.com/#zh-CN/en/%E6%B3%95%E5%B8%83%E9%87%8C%20-%20%E7%8F%80%E7%BD%97 on Feb. 5, 2014, p. 1.*
Paul et al., Novel configuration for lateral pressure tuning of a fiber Bragg grating without peak splitting, Oct. 2004, Optical Engineering, vol. 43, Issue 10, OE letters, pp. 2208-2209.*
International Search Report cited in PCT/CN2010/076181 dated Oct. 11, 2011.
Simultaneous Distributed Measurements of Temperature and Strain using Spontaneous Raman and Brillouin Scattering, Alahbabi et al., Optoelectronics Research Center, University of Southampton, 4 pgs. (Jun. 2009).

\* cited by examiner

*Primary Examiner* — David Porta
*Assistant Examiner* — Jeremy S Valentiner
(74) *Attorney, Agent, or Firm* — Workman Nydegger

(57) ABSTRACT

A distributed optical fiber sensor based on Raman and Brillouin scattering is provided. The distributed optical fiber sensor includes a semiconductor FP cavity pulsed wideband optical fiber laser (11), a semiconductor external-cavity continuous narrowband optical fiber laser (12), a wave separator (13), an electro-optic modulator (14), an isolator (15), an Er-doped optical fiber amplifier (16), a bidirectional coupler (17), an integrated wavelength division multiplexer (19), a first photoelectric receiving and amplifying module (20), a second photoelectric receiving and amplifying module (21), a direct detection system (22), a narrowband optical fiber transmission grating (23), a circulator (24) and a coherence detection module (25). The temperature and the strain can be measured simultaneously, and the signal-to-noise ratio of the system is enhanced.

9 Claims, 1 Drawing Sheet

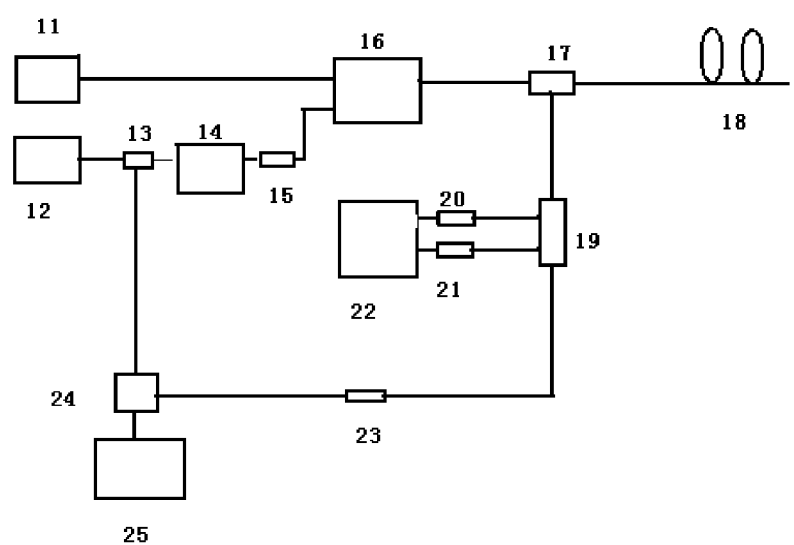

DISTRIBUTED OPTICAL FIBER SENSOR BASED ON RAMAN AND BRILLOUIN SCATTERING

TECHNICAL FIELD

The present invention relates to a technical field of optical fiber sensing, and specifically to a distributed optical fiber sensor based on Raman and Brillouin scattering.

BACKGROUND OF THE INVENTION

In the field of distributed optical fiber sensors, there are distributed optical fiber Raman scattering photon temperature sensors and distributed Brillouin scattering photon sensors. In the Chinese patent CN101324424, the detection and pumping light source is adopted, an optical fiber Raman amplifier is used to replace a traditional optical fiber Brillouin amplifier to obtain backward optical fiber Stimulated Brillouin Scattering (SBS) light ray, and strain information is obtained by measurement of the frequency shifts of the SBS light ray. However, the optical fiber Raman amplifier is expensive and high in cost. Using a narrowband laser light source, the Newson research team from University of Southampton in United Kingdom measures fiber temperature variations by the detection of optical fiber backward spontaneous anti-Stokes Raman scattering, and measures the fiber strains by the detection of spontaneous optical fiber Brillouin scattering. However, as the optical fiber Brillouin scattering has narrow spectrum bandwidth, the measurement precision of temperatures or strains is low (M. N. Allahbabi, Y. T. Cho and T. P. Newson, Simulataneous Distributed Measurements of Temperature and Strain using Spontaneous Raman and Brillouin Scattering, Optics Letters, 2005, 1 Jun., p. 1276-1278). The Chinese patent CN101162158 is suitable for measurement of the temperature and strain of a super-remote optical fiber. However, an optical fiber Raman amplifier is embedded into the system, which tends to cause mutual interference due to non-linear effect of the optical fiber. Moreover, the optical fiber Raman amplifier is expensive and high in cost.

SUMMARY OF THE INVENTION

In view of the above, the present invention provides a distributed optical fiber sensor based on Raman and Brillouin scattering.

One technical solution of the present invention is as follows: a distributed optical fiber sensor based on Raman and Brillouin scattering includes: a semiconductor Fabary-Perot (FP) cavity pulsed wideband optical fiber laser, a semiconductor external-cavity continuous narrowband optical fiber laser, a wave separator, an electro-optic modulator, an isolator, an Er-doped optical fiber amplifier, a bidirectional coupler, an integrated wavelength division multiplexer, two photoelectric receiving and amplifying modules, a direct detection system, a narrowband optical fiber transmission grating, a circulator, and a coherence detection module; wherein an output terminal of the semiconductor FP cavity pulsed wideband optical fiber laser is connected with an input terminal of the Erbium (Er)-doped optical fiber amplifier; an output terminal of the semiconductor external cavity continuous narrowband optical fiber laser is connected with an input terminal of the wave separator; an output terminal of the wave separator is connected successively to the electro-optic modulator, the isolator and another input terminal of the Er-doped optical fiber amplifier; an output terminal of the Er-doped optical fiber amplifier is connected with an input terminal of the bidirectional coupler; an output terminal of the bidirectional coupler is connected with a single-mode optical fiber, and another output terminal of the bidirectional coupler is connected with an input terminal of the integrated wavelength division multiplexer; two output ports of the integrated wavelength division multiplexer are connected with the direct detection system via the first photoelectric receiving and amplifying module and the second photoelectric receiving and amplifying module respectively, and a third output port of the integrated wavelength division multiplexer is connected with an input terminal of the circulator via the narrowband optical fiber transmission grating; another input terminal of the circulator is connected with another output terminal of the wave separator, and an output terminal of the circulator is connected with the coherence detection module.

The above-mentioned semiconductor FP cavity pulsed wideband optical fiber laser has a pulse width less than 30 ns and wavelength of 1550 nm. The semiconductor external-cavity continuous narrowband optical fiber laser has the spectrum width of 10 MHz and wavelength of 1555 nm. The two light sources are in different wavebands, thus achieving wavelength division multiplexing.

The above-mentioned integrated wavelength division multiplexer includes: two pairs of optical fiber couplers, a self-focusing lens with parallel light path, an optical filter with the central wavelength of 1450 nm, the spectrum bandwidth of 38 nm and the attenuation less than 0.3 dB, and an optical filter with the central wavelength of 1660 nm, the spectrum bandwidth of 40 nm and the attenuation less than 0.3 dB; the integrated wavelength division multiplexer has four ports including one input port and three output ports. The first output port is working at 1450 nm for optical fiber anti-Stokes Raman scattering light, the second output port is working at 1660 nm for optical fiber Stokes Raman scattering light, and the third output port is working at 1550 nm for optical fiber Rayleigh and Brillouin scattering light.

The above-mentioned narrowband optical fiber transmission grating is an optical fiber grating with the central wavelength of 1555.08 nm, the spectrum bandwidth of 0.1 nm, the attenuation less than 0.3 dB, and the isolation higher than 35 dB.

The distributed optical fiber sensor based on Raman and Brillouin scattering according to embodiments of the present invention is based on the wavelength division multiplexing theory and the fusion theory of the optical fiber non-linear optical scattering, measures temperatures of the optical fiber based on an intensity ratio of the backward optical fiber spontaneous anti-Stokes and Stokes Raman scattering light rays, and measures the strains of the optical fiber based on frequency shifts of the backward optical fiber spontaneous Brillouin scattering light, thus realizing simultaneous measurement of the temperature and the strain, enhancing the signal-to-noise ratio of the system, and improving the measurement precision.

The laser generated by the semiconductor FP cavity pulse wideband optical fiber laser passes through the Er-doped optical fiber amplifier and the bidirectional coupler into the single-mode optical fiber, the backward Raman scattering light from the single-mode optical fiber passes through the bidirectional coupler and is input into the integrated wavelength division multiplexer; the anti-Stokes and Stokes spontaneous Raman scattering light rays output from the first and second output ports of the integrated wavelength division multiplexer pass through the first and second photoelectric receiving and amplifying modules respectively, and enter into the direct detection system. The direct detection system processes the signals received, and provides the temperature information of each segment of the optical fiber according to a power ratio value between the anti-Stokes and Stokes spontaneous Raman scattering light rays. The continuous laser output from the semiconductor external cavity continuous narrowband optical fiber laser passes through the wave separator and modulated by the electro-optic modulator into a 30 ns pulse laser light, and then further passes through the isolator, the Er-doped optical fiber amplifier and the bidirectional coupler into the single-mode optical fiber; the backward Brillouin scattering light of the optical fiber passes successively through the bidirectional coupler, the third output port of the integrated wavelength division multiplexer, the narrowband optical fiber transmission grating into the circulator, and is, together with the local laser from the wave separator into the circulator, input into the coherence detection module. The frequency shift of the optical fiber Brillouin scattering light is measured by the coherence detection module, and then the information of strain and temperature of each segment of the optical fiber is obtained.

The temperature measurement theory of optical fiber Raman scattering is: the intensity ratio I (T) of the anti-Stokes Raman scattering light to the Stokes Raman scattering light:

$$I(T) = \frac{\phi_a}{\varphi_s} = \left[\frac{v_a}{v_s}\right]^4 e^{-\left(\frac{h\Delta v_r}{kT}\right)} \quad (1)$$

wherein $\phi_a$、$\phi_s$ are electrical level values after photoelectric transformation, $v_a$, $v_s$ are frequencies of the anti-Stokes Raman scattering photon and the Stokes Raman scattering photon, h is the Planck constant and h=6.626 068 76.52×$10^{-34}$ J·s (the basic physics constant datum in year 1998), $\Delta v$ is the phonon frequency of the optical fiber molecule and equals to 13.2 THz, k is the Boltzmann constant and k=1.380 650324×$10^{-23}$ J$K^{-1}$, T is the Kelvin absolute temperature. Based on the intensity ratio of the two types of light, temperature information of each segment of the optical fiber is obtained.

The theory for strain and temperature measurement of optical fiber Brillouin scattering is as follows: in the optical fiber, the incident laser in the optical fiber interacts non-linearly with the sound wave in the optical fiber, the sound wave is then generated through electrostriction of the light wave, which causes periodical modulation to an optical fiber refractive index to form a spatial refractive index grating, generates Brillouin scattering light with frequency shifts; the frequency shift $v_B$ of the backward Brillouin scattering formed in the optical fiber is:

$$v_B = 2nv/\lambda \quad (2)$$

wherein n is the refractive index at the incident light wavelength $\lambda$, v is the sound velocity in the optical fiber; for the quartz optical fiber, $v_B$ is about 11 GHz when $\lambda$ is approximately 1550 nm.

The frequency shift $v_B$ of the Brillouin scattering light in the optical fiber has strain and temperature effect:

$$v_B = v_{B_0} + \frac{\partial v}{\partial \varepsilon}\varepsilon(\mu\varepsilon) + \frac{\partial v}{\partial T}T(^\circ C.) \quad (3)$$

The frequency shift of the Brillouin scattering light is:

$$\delta v_B = C_{v\varepsilon}\delta\varepsilon + C_{vT}\delta T \quad (4)$$

wherein the strain coefficient $C_{v\varepsilon}$ and the temperature coefficient $C_{vT}$ of the frequency shift are:

$$C_{v\varepsilon}=0.0482\pm0.004 \text{ MHz}/\mu\varepsilon, C_{vT}=1.10\pm0.02 \text{ MHz}/K$$

The strain amount of each segment of the optical fiber is obtained by measurement of the frequency shift of the optical fiber Brillouin scattering light ray.

The technical advantages of the present invention include: according to embodiments of the present invention, based on the fusion theory and the wavelength division multiplexing theory of the optical fiber non-linear optical scattering, two laser light sources are adopted. One is the semiconductor FP cavity pulsed wideband optical fiber laser, and measures temperature based on the intensity ratio of the optical fiber spontaneous Raman scattering; the other is the semiconductor external-cavity continuous narrowband optical fiber laser, and measures strain based on the frequency shift of the optical fiber spontaneous Brillouin scattering light ray. Thereby, the signal-to-noise ratio of the system is enhanced, the temperature and the strain can be spatially measured simultaneously, and the measurement precision can also be improved.

DESCRIPTION OF THE DRAWINGS

FIG. 1 is a block diagram illustrating a structure of a distributed optical fiber sensor based on Raman and Brillouin scattering, which illustrates a semiconductor FP cavity pulsed wideband optical fiber laser 11, a semiconductor external-cavity continuous narrowband optical fiber laser 12, a wave separator 13, an electro-optic modulator 14, an isolator 15, an Er-doped optical fiber amplifier 16, a bidirectional coupler 17, an integrated wavelength division multiplexer 19, a first photoelectric receiving and amplifying module 20, a second photoelectric receiving and amplifying module 21, a direct detection system 22, a narrowband optical fiber transmission grating 23, a circulator 24 and a coherence detection module 25.

DESCRIPTION OF EXEMPLARY EMBODIMENTS

Referring to FIG. 1, the distributed optical fiber sensor based on Raman and Brillouin scattering in the present invention includes: a semiconductor FP cavity pulsed wideband optical fiber laser 11, a semiconductor external-cavity continuous narrowband optical fiber laser 12, a wave separator 13, an electro-optic modulator 14, an isolator 15, an Er-doped optical fiber amplifier 16, a bidirectional coupler 17, an integrated wavelength division multiplexer 19, a first photoelectric receiving and amplifying module 20, a second photoelectric receiving and amplifying module 21, a direct detection system 22, a narrowband optical fiber transmission grating 23, a circulator 24, and a coherence detection module 25.

In an embodiment, an output terminal of the semiconductor FP cavity pulsed wideband optical fiber laser 11 is connected with an input terminal of the Er-doped optical fiber amplifier 16; an output terminal of the semiconductor external-cavity continuous narrowband optical fiber laser 12 is connected with an input terminal of the wave separator 13; an output terminal of the wave separator 13 is connected successively to the electro-optic modulator 14, the isolator 15 and another input terminal of the Er-doped optical fiber amplifier 16; an output terminal of the Er-doped optical fiber amplifier 16 is connected with an input terminal of the bidirectional coupler 17; an output terminal of the bidirectional coupler 17 is connected with a single-mode optical fiber 18, and another output terminal of the bidirectional coupler 17 is connected with an input terminal of the integrated wavelength division multiplexer 19; two output ports of the integrated wavelength division multiplexer 19 are connected with the direct detection system 22 via the first photoelectric receiving and amplifying module 20 and the second photoelectric receiving and amplifying module 21 respectively, and a third output port of the integrated wavelength division multiplexer 19 is connected with an input terminal of the circulator 24 via the narrowband optical fiber transmission grating 23; another input terminal of the circulator 24 is connected with another output terminal of the wave separator 13, and an output terminal of the circulator 24 is connected with the coherence detection module 25.

The semiconductor pulsed optical fiber laser 11 is a semiconductor FP cavity high power optical fiber laser having a pulse width less than 30 ns and central wavelength of 1550 nm. The semiconductor external-cavity narrowband optical fiber laser 12 is a semiconductor external-cavity continuous optical fiber laser 12 having a spectrum width of 10 MHz and the central wavelength of 1555 nm, and is modulated, by the electro-optic modulator 14, to a pulsed laser having a pulse width of 30 ns. The two light sources are in different wavebands, and achieve wavelength division multiplexing.

The integrated wavelength division multiplexer 19 may be a SZMX-WDM-2 type wavelength division multiplexer from Ming Xin Photoelectric Company, which includes: two pairs of optical fiber couplers, a self-focusing lens with parallel light path, an optical filter with central wavelength of 1450 nm as well as spectrum bandwidth of 38 nm and attenuation less than 0.3 dB, and an optical filter with the central wavelength of 1660 nm, the spectrum bandwidth of 40 nm and the attenuation less than 0.5 dB. The integrated wavelength division multiplexer 19 has one input port and three output ports, wherein the first output port is working at 1450 nm, the second output port is working at 1660 nm and the third output port is working at 1550 nm, and wherein the first output port is for optical fiber anti-Stokes Raman scattering light, the second output port is for optical fiber Stokes Raman scattering light, and the third output port is for optical fiber Rayleigh and Brillouin scattering light.

The narrowband optical fiber transmission grating 23 may be a narrowband optical fiber transmission grating with central wavelength of 1555.08 nm, or may be an optical fiber grating with spectrum bandwidth of 0.1 nm, attenuation less than 0.3 dB and isolation more than 35 dB. The narrowband optical fiber transmission grating 23 selects the optical fiber Brillouin scattering light from the third output port of the integrated wavelength division multiplexer and isolates the backward optical fiber Rayleigh scattering light.

Either of the first photoelectric receiving and amplifying module 20 and the second photoelectric receiving and amplifying module 21 is formed of a low-noise InGaAs photoelectric avalanche diode, a low-noise MAX4107 preamplifier and a main amplifier which are connected by optical fibers.

The direct detection system 22 may be an NI5911 type signal processing card with dual-channel bandwidth of 100 MHz and a collection rate of 100 MS/s from U.S.A. NI (National Instruments) Inc., or may be a CS21GB-1 GHz type signal processing card with dual channels and a collection rate of 500 MS/s from Canada GaGe Inc.

The coherence detection module 25 performs coherence detection on the backward optical fiber Brillouin scattering light and the local light of the external-cavity narrowband optical fiber laser by means of beat frequency performed by a photoelectric detector, and measures the frequency shift to obtain the strain information of each segment of the optical fiber.

The invention claimed is:

1. A distributed optical fiber sensor based on Raman and Brillouin scattering, comprising:
   a semiconductor Fabary-Perot (FP) cavity pulsed wideband optical fiber laser, a semiconductor external-cavity continuous narrowband optical fiber laser, a wave separator, an electro-optic modulator, an isolator, an Erbium (Er)-doped optical fiber amplifier, a bidirectional coupler, an integrated wavelength division multiplexer, a first photoelectric receiving and amplifying module, a second photoelectric receiving and amplifying module, a direct detection system, a narrowband optical fiber transmission grating, a circulator, and a coherence detection module;
   wherein an output terminal of the semiconductor FP cavity pulsed wideband optical fiber laser is connected with an input terminal of the Er-doped optical fiber amplifier; an output terminal of the semiconductor external-cavity continuous narrowband optical fiber laser is connected with an input terminal of the wave separator; an output terminal of the wave separator is connected successively to the electro-optic modulator, the isolator and another input terminal of the Er-doped optical fiber amplifier; an output terminal of the Er-doped optical fiber amplifier is connected with an input terminal of the bidirectional coupler; an output terminal of the bidirectional coupler is connected with a single-mode optical fiber, and another output terminal of the bidirectional coupler is connected with an input terminal of the integrated wavelength division multiplexer; two output ports of the integrated wavelength division multiplexer are connected with the direct detection system via the first photoelectric receiving and amplifying module and the second photoelectric receiving and amplifying module, respectively; a third output port of the integrated wavelength division multiplexer is connected with an input terminal of the circulator via the narrowband optical fiber transmission grating; another input terminal of the circulator is connected with another output terminal of the wave separator, and an output terminal of the circulator is connected with the coherence detection module.

2. The distributed optical fiber sensor according to claim 1, wherein the semiconductor FP cavity pulsed wideband optical fiber laser has pulse width less than 30 ns and wavelength of 1550 nm.

3. The distributed optical fiber sensor according to claim 1, wherein the semiconductor external-cavity continuous narrowband optical fiber laser has spectrum width of 10 MHz and wavelength of 1555 nm.

4. The distributed optical fiber sensor according to claim 1, wherein the integrated wavelength division multiplexer comprises: two pairs of optical fiber couplers, a self-focusing lens with parallel light path, an optical filter with central wavelength of 1450 nm, spectrum bandwidth of 38 nm and attenuation less than 0.3 dB, and an optical filter with central wavelength of 1660 nm, spectrum bandwidth of 40 nm and attenuation less than 0.3 dB; and wherein the integrated wavelength division multiplexer has four ports including one input port and three output ports, wherein a first output port is working at 1450 nm for optical fiber anti-Stokes Raman scattering light, a second output port is working at 1660 nm for optical fiber Stokes Raman scattering light, and a third output port is working at 1550 nm for optical fiber Rayleigh and Brillouin scattering light.

5. The distributed optical fiber sensor according to claim 1, wherein the narrowband optical fiber transmission grating is an optical fiber grating with central wavelength of 1555.08 nm, spectrum bandwidth of 0.1 nm, attenuation less than 0.3 dB, and isolation higher than 35 dB.

6. A distributed optical fiber sensor based on Raman and Brillouin scattering, comprising:
  a semiconductor Fabary-Perot (FP) cavity pulsed wideband optical fiber laser, a semiconductor external-cavity continuous narrowband optical fiber laser, a wave separator, an electro-optic modulator, an isolator, an Erbium (Er)-doped optical fiber
  amplifier, a bidirectional coupler, an integrated wavelength division multiplexer, a first photoelectric receiving and amplifying module, a second photoelectric receiving and amplifying module, a direct detection system, a narrowband optical fiber transmission grating, a circulator, and a coherence detection module;
  wherein an output terminal of the semiconductor FP cavity pulsed wideband optical fiber laser is connected with an input terminal of the Er-doped optical fiber amplifier; an output terminal of the semiconductor external-cavity continuous narrowband optical fiber laser is connected with an input terminal of the wave separator;
  an output terminal of the wave separator is connected successively to the electro-optic modulator which modulates a pulse width of a first signal from the semiconductor external-cavity continuous narrowband optical fiber laser to be the same as a pulse width of a second signal from the semiconductor FP cavity pulsed wideband optical fiber laser, the isolator and another input terminal of the Er-doped optical fiber-amplifier; an output terminal of the Er-doped optical fiber amplifier is connected with an input terminal of the bidirectional coupler; an output terminal of the bidirectional coupler is connected with a single-mode optical fiber, and another output terminal of the bidirectional coupler is connected with an input terminal of the integrated wavelength division multiplexer; two output ports of the integrated wavelength division multiplexer are connected with the direct detection system via the first photoelectric receiving and amplifying module and the second photoelectric receiving and amplifying module, respectively; a third output port of the integrated wavelength division multiplexer is connected with an input terminal of the circulator via the narrowband optical fiber transmission grating; another input terminal of the circulator is connected with another output terminal of the wave separator, and an output terminal of the circulator is connected with the coherence detection module;
  wherein the narrowband optical fiber transmission grating is an optical fiber grating with central wavelength of 1555.08 nm, spectrum bandwidth of 0.1 nm, attenuation less than 0.3 dB, and isolation higher than 35 dB.

7. The distributed optical fiber sensor according to claim 1, wherein the semiconductor FP cavity pulsed wideband optical fiber laser has pulse width less than 30 ns and wavelength of 1550 nm.

8. The distributed optical fiber sensor according to claim 1, wherein the semiconductor external-cavity continuous narrowband optical fiber laser has spectrum width of 10 MHz and wavelength of 1555 nm.

9. The distributed optical fiber sensor according to claim 1, wherein the integrated wavelength division multiplexer comprises: two pairs of optical fiber couplers, a self-focusing lens with parallel light path, an optical filter with central wavelength of 1450 nm, spectrum bandwidth of 38 nm and attenuation less than 0.3 dB, and an optical filter with central wavelength of 1660 nm, spectrum bandwidth of 40 nm and attenuation less than 0.3 dB; and wherein the integrated wavelength division multiplexer has four ports including one input port and three output ports, wherein a first output port is working at 1450 nm for optical fiber anti-Stokes Raman scattering light, a second output port is working at 1660 nm for optical fiber Stokes Raman scattering light, and a third output port is working at 1550 nm for optical fiber Rayleigh and Brillouin scattering light.

\* \* \* \* \*